Patented June 7, 1938

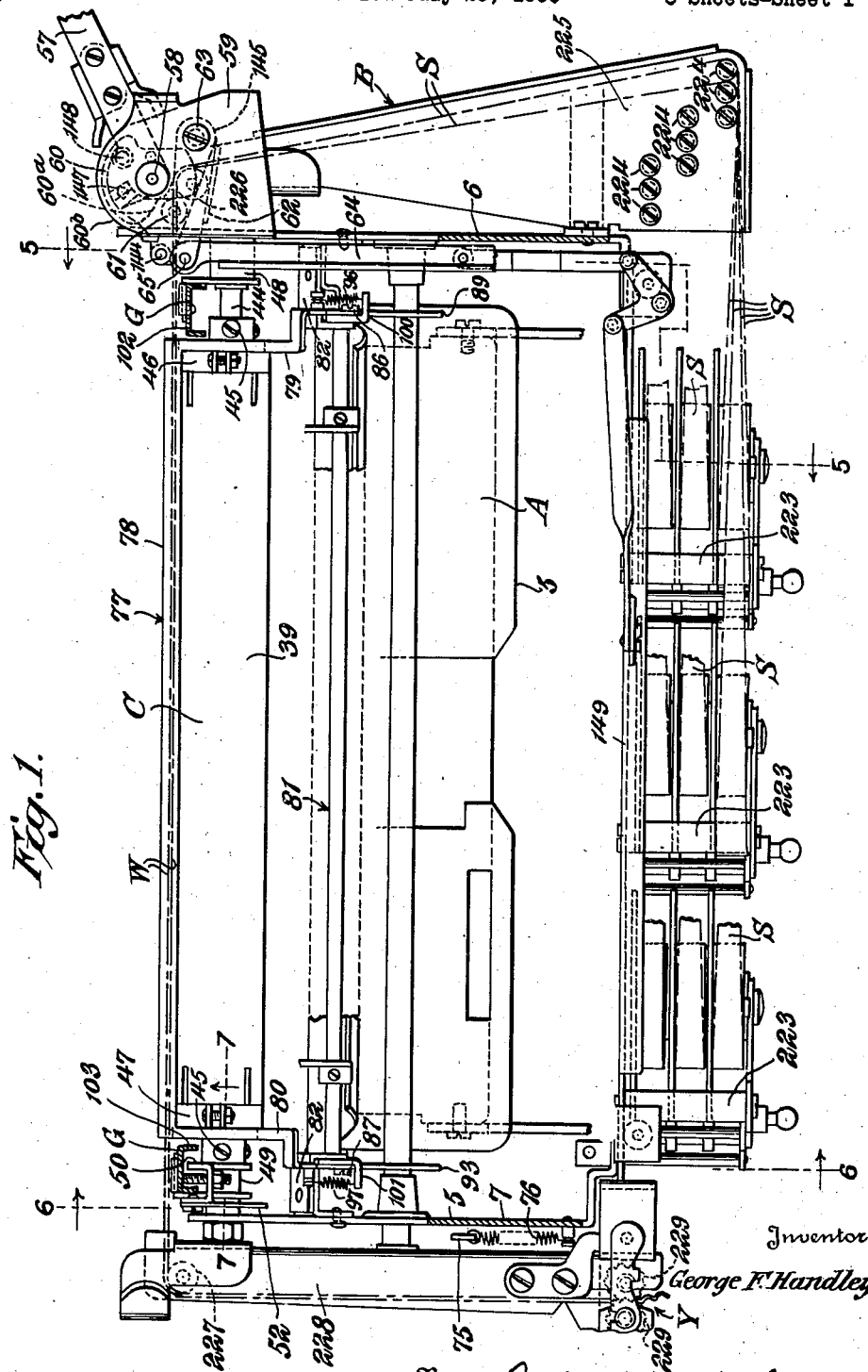

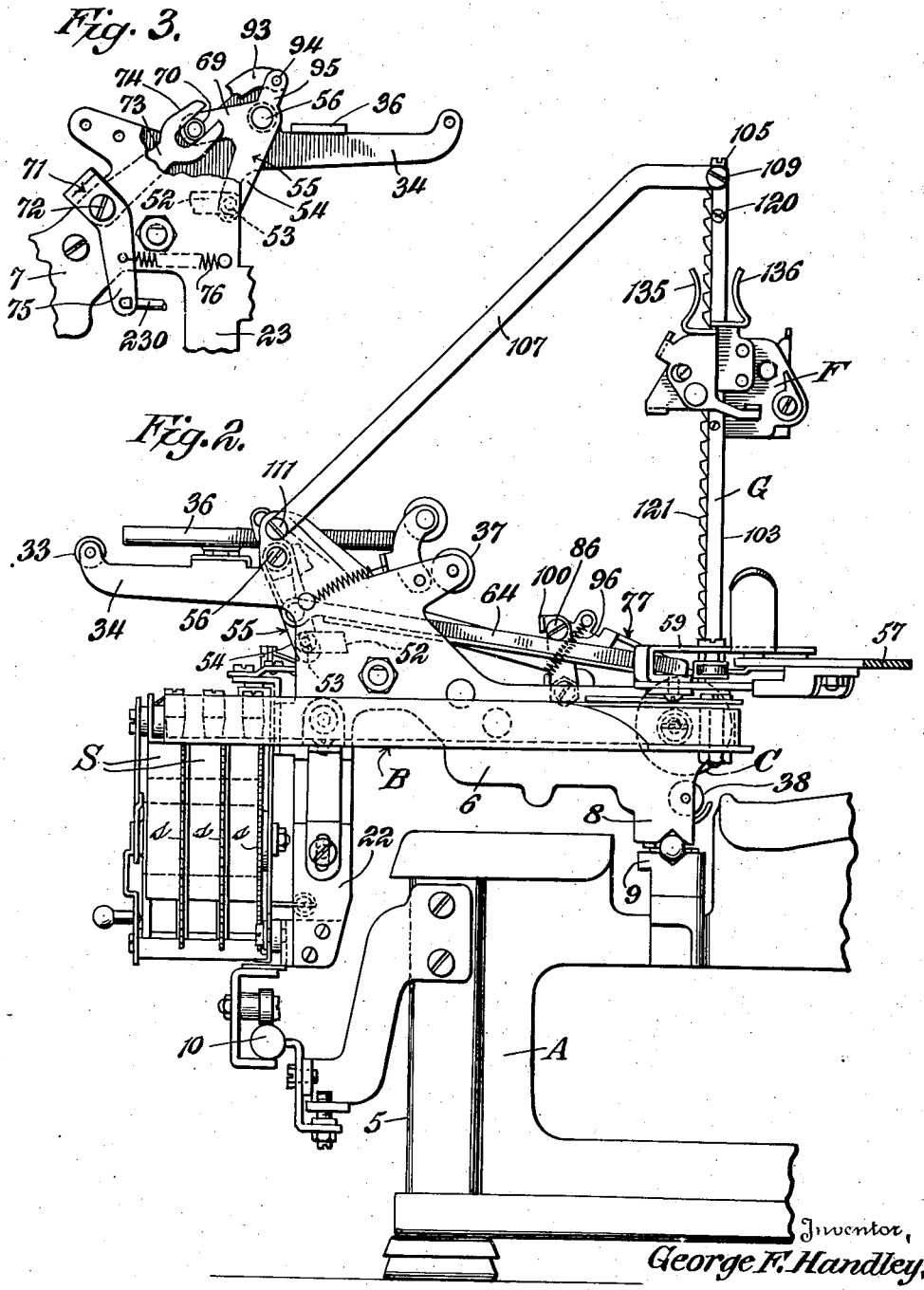

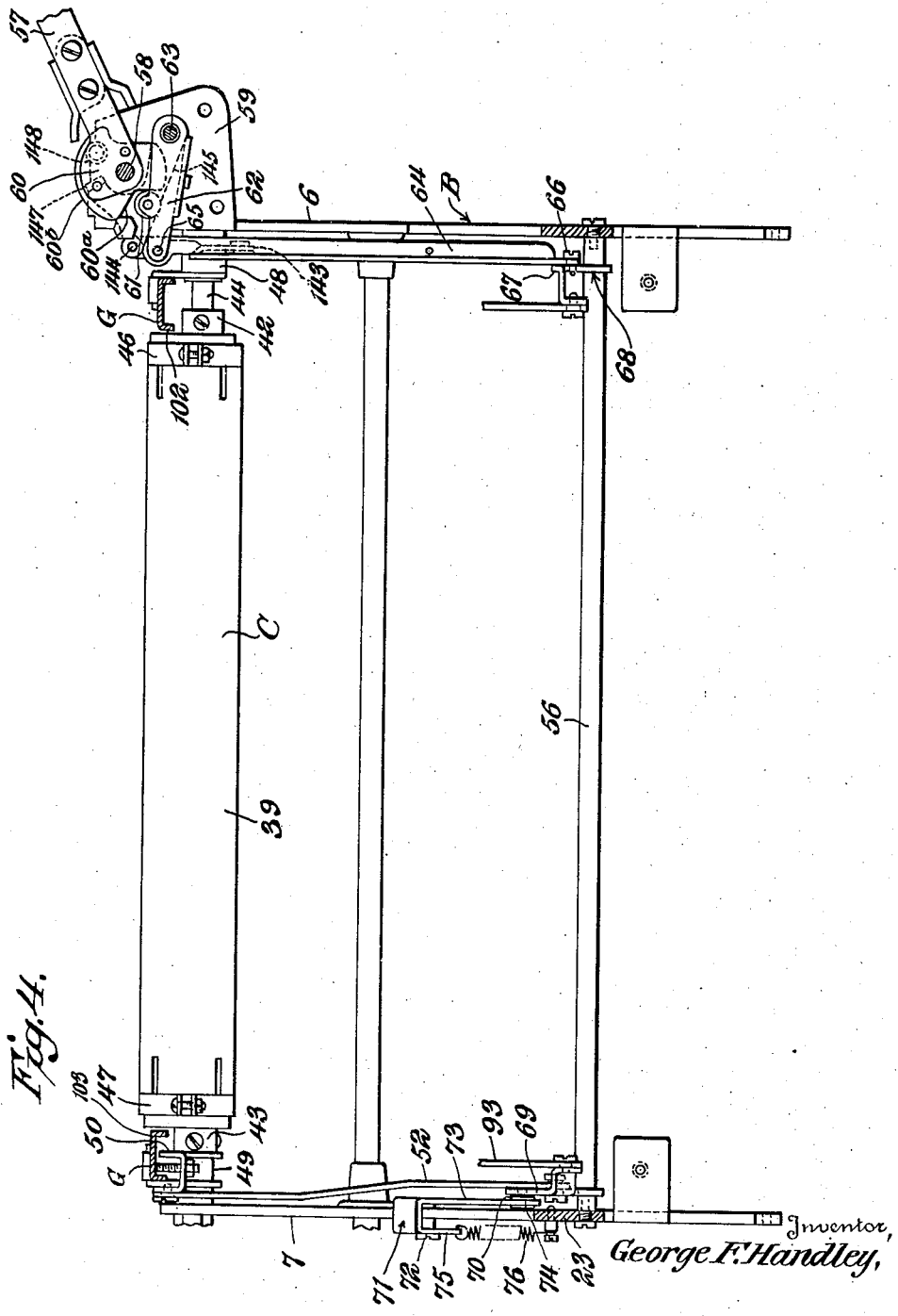

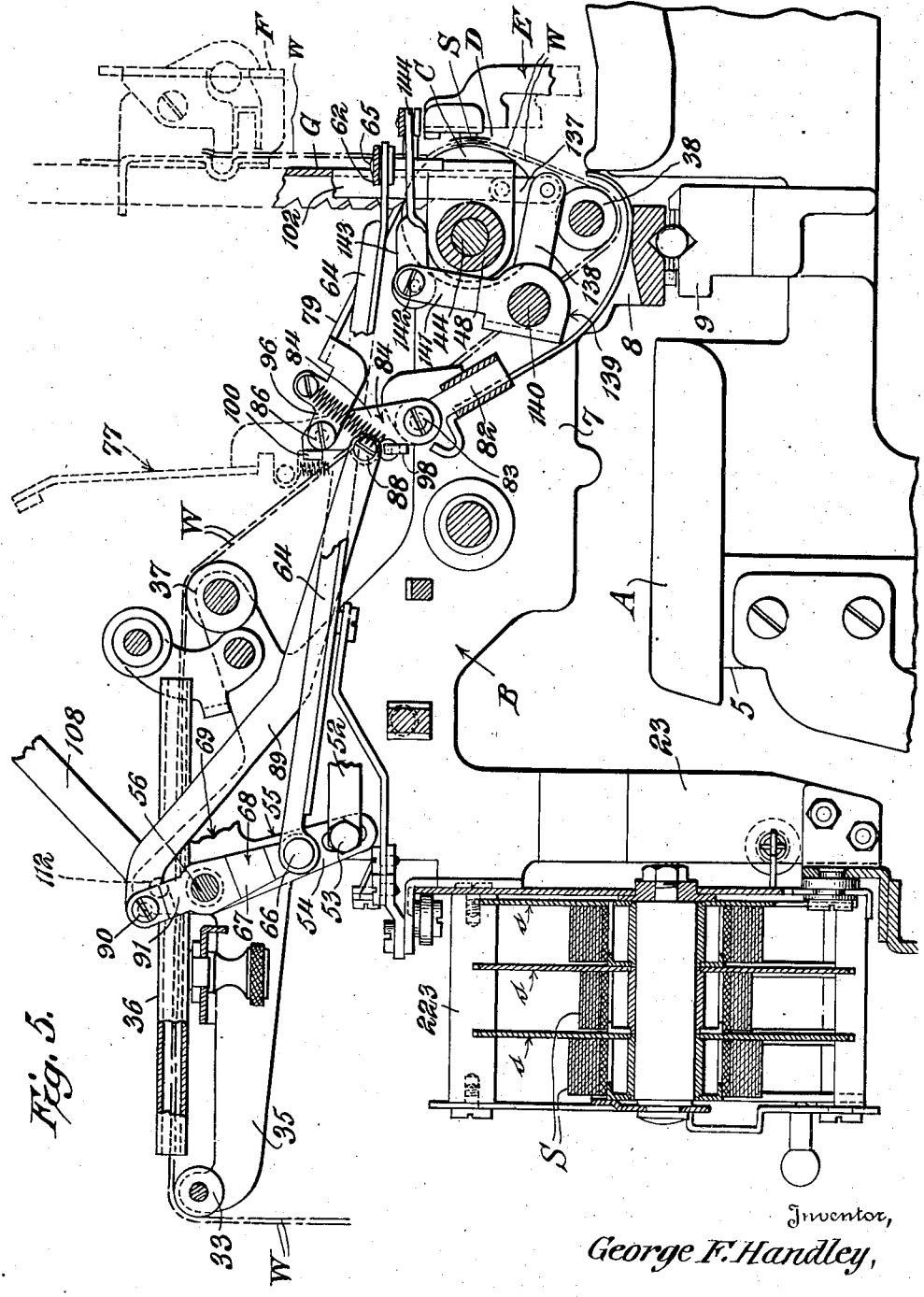

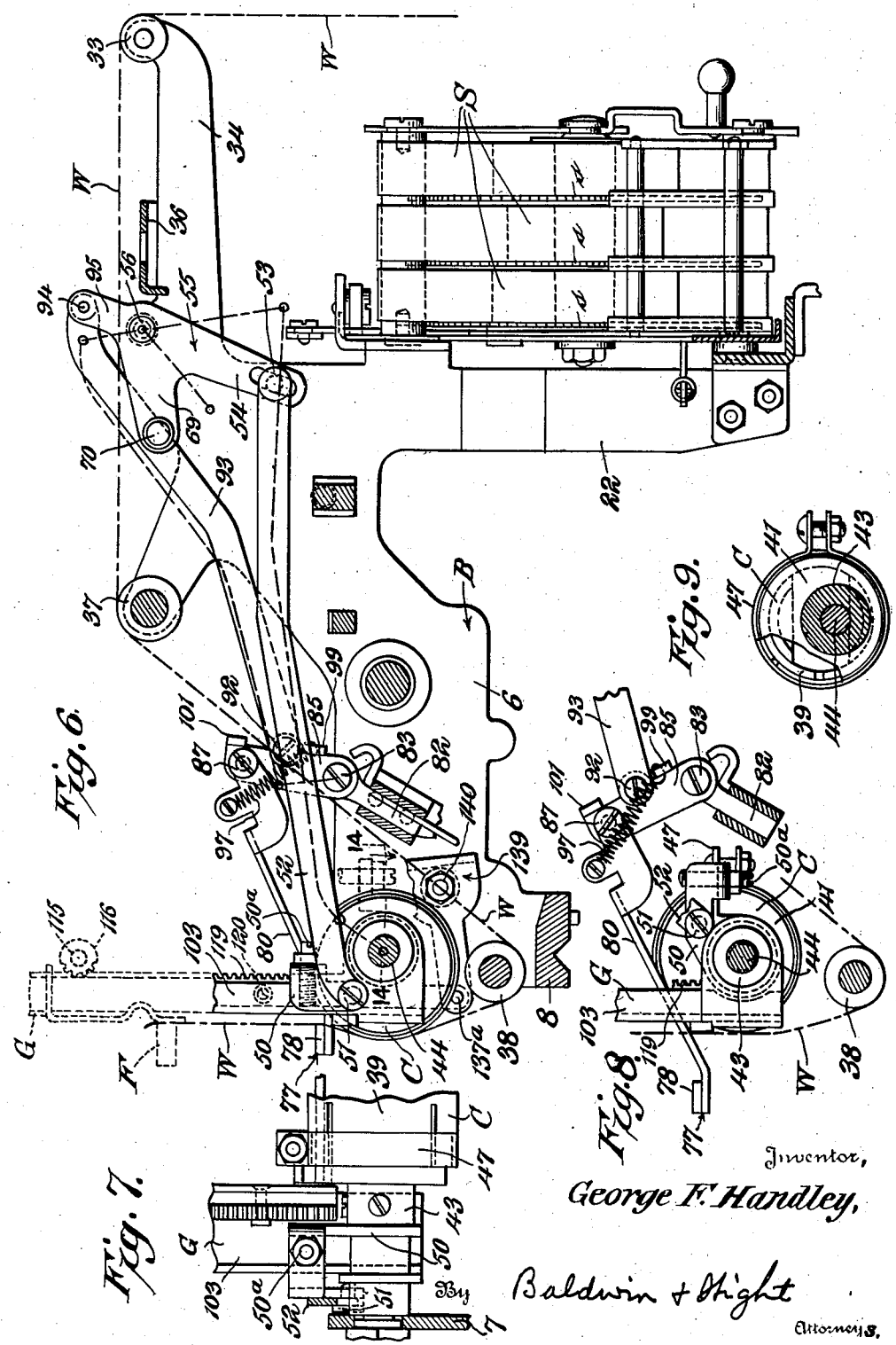

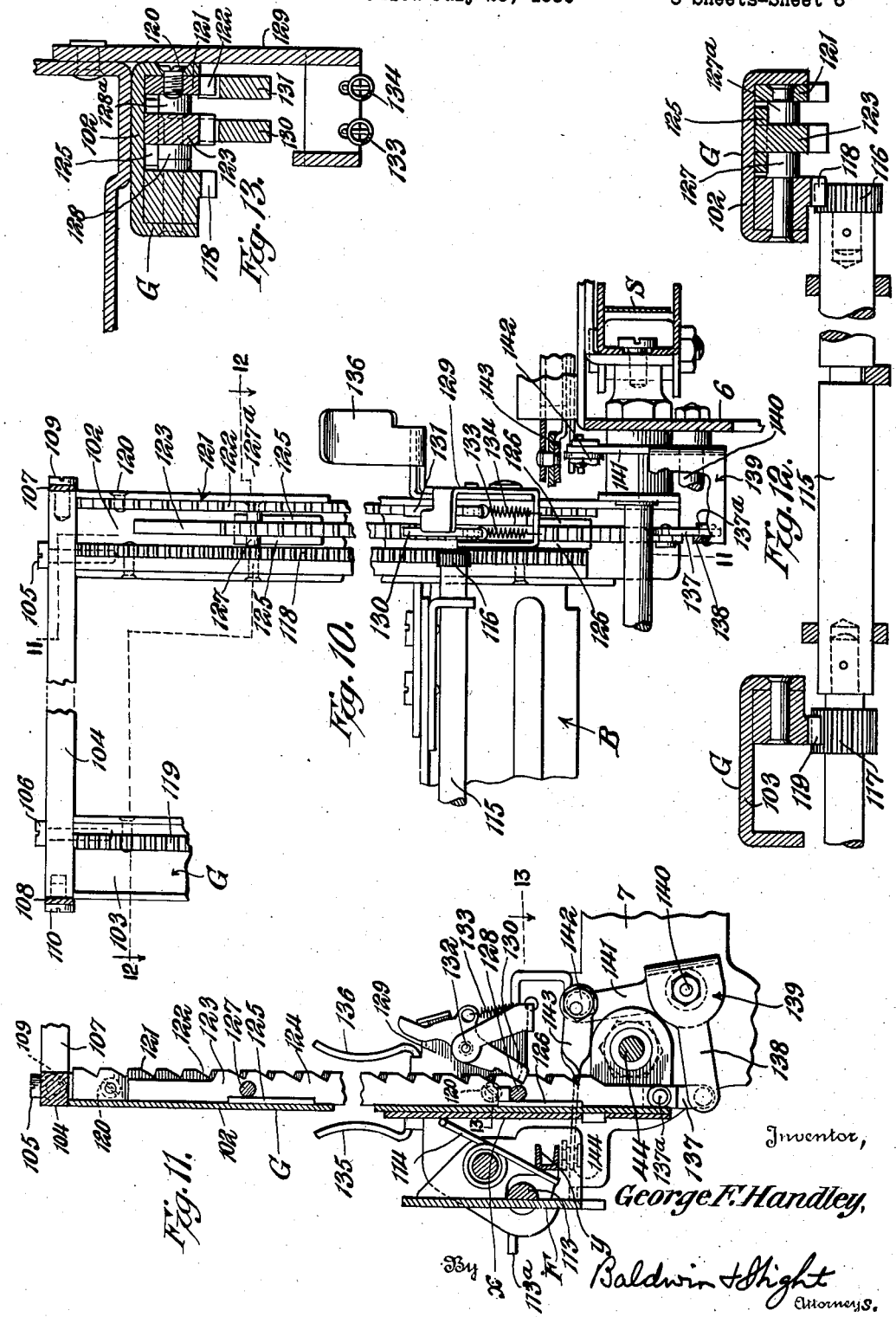

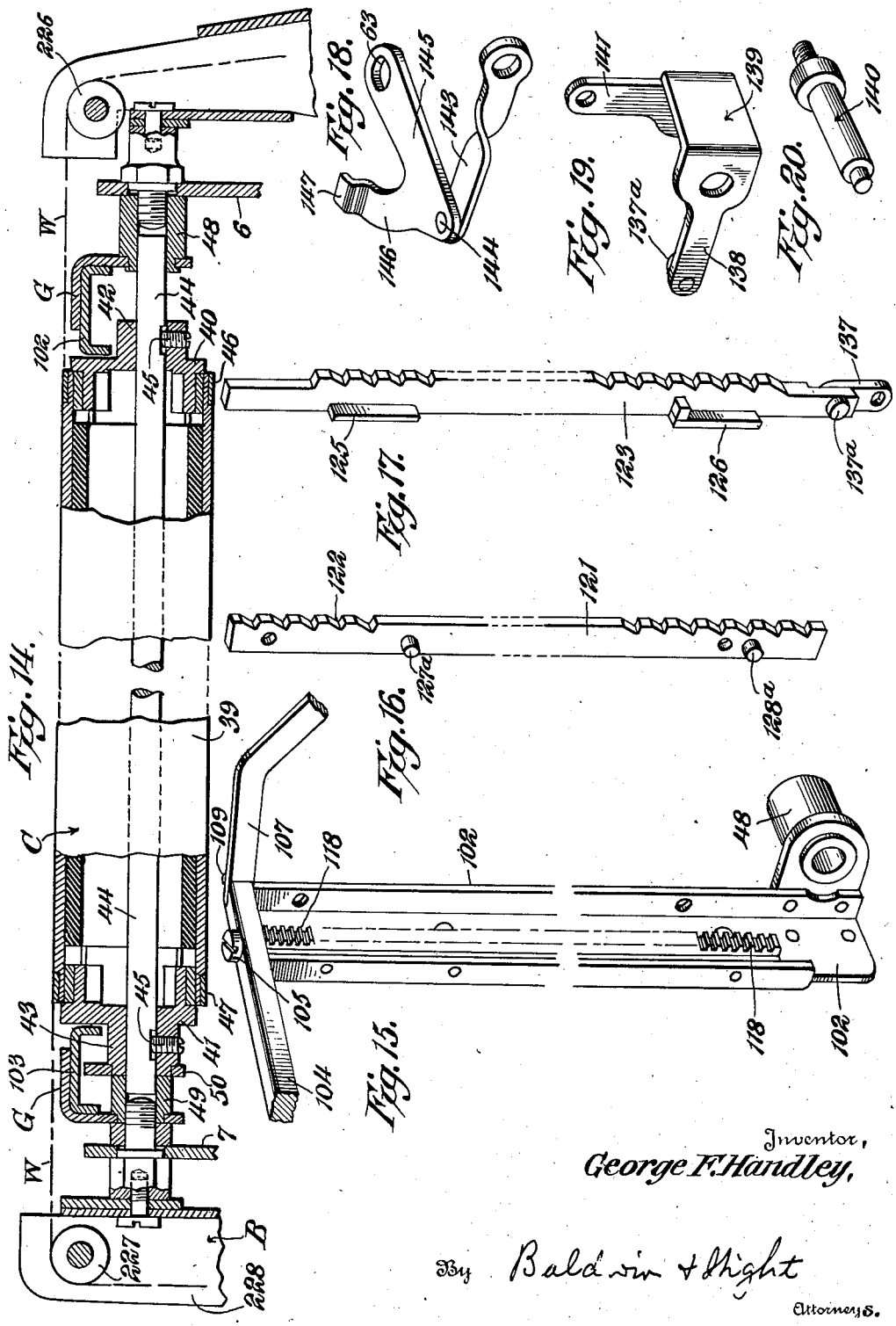

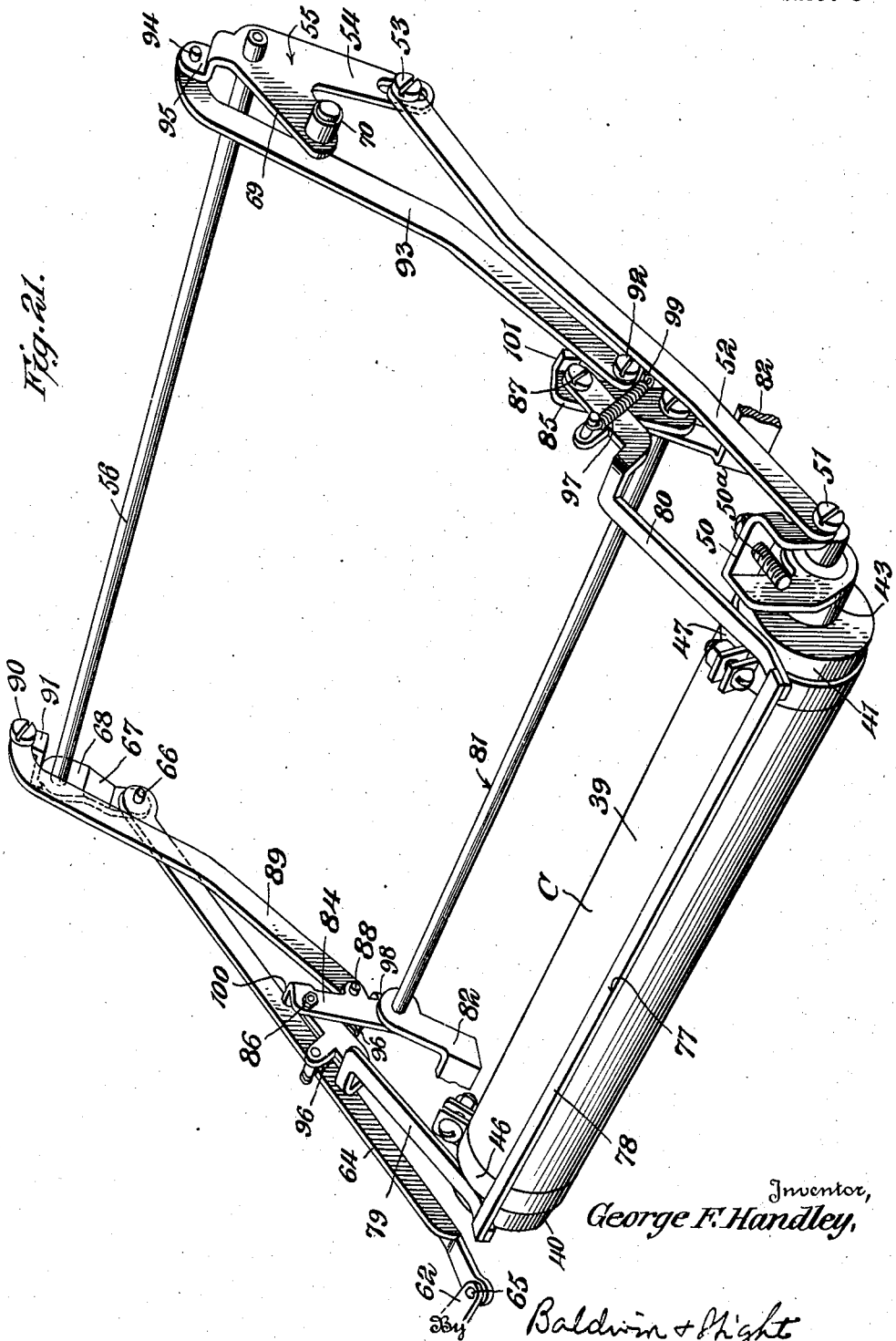

2,119,814

UNITED STATES PATENT OFFICE 2,119,814

TYPEWRITING MACHINE

George F. Handley, Glendale, N. Y., assignor to Royal Typewriter Company, Inc., New York, N. Y., a corporation of New York Application July 23, 1936, Serial No. 92,242

41 Claims. (Cl. 197—133)

This invention relates to new and useful improvements in manifolding devices which may be readily applied to any standard typewriting machine without changing such machine in any material respect, and embodies certain improvements over the following patents: Degener, 1,853,302, April 12, 1932, Degener, 1,853,670, April 12, 1932.

Among the several objects of this invention are to provide a platen which is mounted to swing about an eccentric axis for movement with respect to the work sheets whereby the normal tight contact relation between the platen and the work sheets will be quickly relieved to permit the immediate feeding of the carbon strips across the work sheets; to provide means for mounting the movable platen whereby the force of the type impacts will be directed against the fulcrum of the platen; to provide a bail for positioning the work sheets against the platen above the writing line thereof to thereby avoid the upper type striking said sheets when the lower types are being employed; to provide means for moving the bail forwardly when the platen is moved rearwardly whereby the work sheets will be relieved of their normal tight contact relation with the platen prior to the line spacing of the work sheets; and to provide means for substituting the rack bars in the collating frame whenever it is desired to vary the line spacing of the work sheets.

With these and other objects in view which will more fully appear, the nature of the invention will be more clearly understood by following the description, the appended claims, and the several views illustrated in the accompanying drawings.

In the drawings:

Figure 1 is a top plan view of a portion of a typewriting machine constructed in accordance with my invention, parts thereof being shown in section;

Figure 2 is a partial elevation of the left side of the machine;

Figure 3 is a detail elevation of the means for operating the carbon strip means;

Figure 4 is a detail plan view showing the carriage return lever in its normal position, and the connections therewith for rocking the platen;

Figure 5 is a vertical sectional view taken on the irregular line 5—5 of Figure 1;

Figure 6 is a similar view but taken on the line 6—6 of Figure 1;

Figure 7 is a detail sectional view taken on the line 7—7 of Figure 1;

Figure 8 is a detail section showing the work sheet bail in its forward or inoperative position;

Figure 9 is a detail cross-sectional view showing the platen in its rearmost or inoperative position;

Figure 10 is a rear elevation of the collating frame and its mounting, and showing the means for removably mounting the rack bar;

Figure 11 is a vertical section taken on the line 11—11 of Figure 10;

Figure 12 is a horizontal section taken on the line 12—12 of Figure 10 with certain parts removed;

Figure 13 is a horizontal section taken on the line 13—13 of Figure 11;

Figure 14 is a longitudinal section taken on the line 14—14 of Figure 6 and showing the platen and the mounting therefor;

Figure 15 is a perspective view of the right hand upright of the collating frame, showing the pinion rack attached thereto;

Figures 16 and 17 are perspective views showing the interchangeable rack bars;

Figure 18 is a perspective view of a lever arm and link connection employed in the manual means for line spacing the work sheets;

Figure 19 is a perspective view of a bell crank lever employed in said means;

Figure 20 is a perspective view of the pivot pin employed for said bell crank lever; and Figure 21 is a perspective view showing the construction and mounting of the platen and bail together with the operating connections therefor.

Like reference numerals designate corresponding parts throughout the several figures of the drawings.

The invention as illustrated in the accompanying drawings is shown as being applied to the well known standard Royal typewriting machine, but it is to be understood that the invention is adapted to be applied to other types of typewriting machines, or to calculating machines or the like.

The machine, as disclosed, includes a main frame A having a rear wall 5, a carriage B having end plates 6, 7, a platen C, a main ribbon D, and type bars E which are operated in the usual manner.

The front portion of the carriage B is supported on the main frame by upper and lower rails 8 and 9, and the rear portion is supported on a horizontal rail 10 which is located in rear of the rear wall 5 of the main frame A.

A supply of work sheets W of indeterminate length is positioned in rear of the machine, and the lead-in ends of the sheets are directed upwardly over a horizontal roller 33 which is mounted on the rear ends of arms 34, 35 integral with and projecting rearwardly beyond the depending legs 22, 23 of the carriage end plates. The lead-in ends of the work sheets are then directed forwardly through spaced horizontal guides 36 supported on the upper part of the carriage, then over a horizontal roller 37 supported on the end plates of the carriage immediately in front of the guide 36, thence forwardly and downwardly under a horizontal guide roller 38 supported by the end plates of the carriage and located below the platen C and in rear of the writing line thereof, and thence upwardly in front of the platen and in rear of the main ribbon D to a truck, clamp, or guide F wherein they are removably clamped, the truck being mounted for line-spacing movements on a vertically disposed stationary collating frame G located above the platen and supported by the end plates of the carriage.

Carbon strips S which are located between the work sheets W extend along the writing line of the platen C, and are intermittently fed across the work sheets by a mechanism which will be described hereinafter.

The platen C which is of the cylinder type is not mounted for intermittent line-spacing rotary movements as in the usual typewriting machines, but instead is eccentrically mounted for backward and forward swinging movements only, as shown particularly in Figures 6, 7, 8, 9 and 14. To this end, the cylinder 39 of the platen is provided at its ends with circular heads 40, 41 having eccentrically positioned longitudinal bearing hubs 42, 43 for receiving a shaft 44 which is fixedly secured in said hubs by screws 45. The cylinder 39 is attached at its ends to the heads 40, 41 by split clamps 46, 47 which when released permit the cylinder to be angularly adjusted with respect to said heads whenever it is desired to change the position of the writing place on the platen. The ends of the shaft project beyond the hubs and are journaled in bearings 48, 49 which are rigidly secured to and project inwardly from the end plates 6, 7 of the carriage B. Rigidly attached to the hub 43 is a rock arm 50 as shown in Figures 6, 7, and 8 particularly, and pivotally connected as at 51 to said rock arm is the forward end of a link 52. The rear end of the link 52 is pivotally connected as at 53 to the arm 54 of a three-armed lever 55 fixed to the right hand end of a rock shaft 56 which is journaled at its ends in the end plates 6, 7 of the carriage. The platen C is positively rocked to its rearmost or non-writing position by means of a manually operable carriage return lever 57 which is fulcrumed as at 58 to oscillate about a vertical axis on a horizontal bracket 59 (Figure 4) which is rigidly secured to and extends outwardly from the front portion of the left end wall 6 of the carriage A. The inner end of the lever 57 is provided with a cam head 60, the cam edge portion 60a engaging a roller 61 mounted on a lever 62 which is pivoted at one end as at 63 to the bracket 59. A link 64 is pivotally connected at its front end as at 65 to the lever 62, and is pivotally connected at its rear end as at 66 to the lower arm 67 of a lever 68 which is fixed to the rock shaft 56. Thus when the operator swings the carriage return lever 57 to the right (or to the left as shown in Figure 1) the lever 62 will effect a rocking of the shaft 56, which, through the medium of the lever 55, link 52, and rock arm 50, will rock the platen C from its forward or operative position as shown in Figure 6 to its rearward or inoperative position as shown in Figure 8.

As above stated, the swinging of the carriage return lever 57 to the right (or to the left as viewed in Figure 1) effects a rearward movement of the platen C to its inoperative position. Upon release of the carriage return lever by the operator, said lever and platen, together with the operating connections therebetween, will be returned automatically to their initial positions. To this end, as shown in Figures 3, 4, and 6, the lever 55 which is fixed to the rock shaft 56 is provided with a forwardly extending rock arm 69 having a roller 70 journaled thereon. A bell crank lever 71 is pivoted at its angle as at 72 on the end plate 7 of the carriage B in front of the rock arm 69. One arm 73 of the bell crank lever 71 extends rearwardly and is provided with a fork 74 which slidably engages the roller 70. The other arm 75 of the bell crank lever 71 extends downwardly and is connected to the forward end of a coil spring 76 whose rear end is anchored to the end plate 23 of the carriage. Thus upon release of the carriage return lever 57 the spring 76 will through the medium of the bell crank lever 71 and arm 69 return not only the rock shaft 56 to its initial position, but also the platen C and the carriage return lever 57 to their initial positions.

It will be observed that the platen is eccentrically mounted to rock about a fixed horizontal axis; that said axis is located within a circle having for its center the center of the arcuate face of the platen and therefore the axis is located eccentrically within the periphery of the platen; that, when the platen is in its operative or writing position, the major axis of the eccentrically mounted platen lies in a horizontal plane which intersects the axis of the platen and the line of writing of the platen, and consequently the force of type impact against the platen will be directed against the fixed axis of the platen; that, when the platen is in its operative or writing position, as shown in Figure 6, the writing line of the platen will be located in front of a plane containing the guide roller 38 and the line spacing truck F and consequently the work sheets W are bowed forwardly and have relatively tight contact with the platen and that as a result the carbon strips S between the work sheets will be correspondingly bowed; that the platen is rocked upwardly and rearwardly through an arc of approximately ninety degrees from its writing or operative position to its non-writing or inoperative position as shown in Figure 8, whereby in the latter position the front horizontal line of the platen will be located at a point considerably in rear of the position of the platen writing line when the latter is in its operative position; and that when the platen is in its inoperative position the work sheets W and carbon strips S will be relieved of their relatively tight contact relation with the platen and the carbon strips will return to their normal or flat relation, whereby the work sheets may be line spaced without dragging the carbon strips upwardly therewith and whereby the carbon strips may be fed freely through the work sheets.

It will be observed that, when the platen C is in its operative or writing position, the work sheets W would normally extend upwardly from the writing line of the platen to the work clamp F. Consequently the work sheets directly above the writing line of the platen would be spaced from the platen surface. Thus, when lower case types are being employed for printing, the upper case types would strike the work sheets directly above the writing line on the platen, and would result in slight impressions being made on the work sheets by the upper case types. Furthermore, by reason of the work sheets being spaced from the platen directly above the writing line, the upper portions of the lower case types would not strike the work sheets with the same force as the lower portions of the lower case types, and uneven impressions would be made on the work sheets. Means are therefore provided for curving or positioning the work sheets and the carbon strips directly above the writing line of the platen into relatively tight contact relation with the platen at the time when said platen is being returned to its operative or writing position, and to relieve said relatively tight contact relation of the work sheets and carbon strips with the platen when the latter is being moved rearwardly to its inoperative position whereby the work sheets may be line spaced upwardly by movement of the truck F without dragging the carbon strips upwardly therewith, and whereby said carbon strips may be fed freely through the work sheets. To this end, I have provided a U-shaped positioning bail 77 comprising a work sheet engaging base or arm 78, and spaced rearwardly extending arms 79, 80, the base or arm 78 being coextensive with the platen and disposed in front of the work sheets and extending beyond the side edges thereof, and the arms 79, 80 extending rearwardly past the side edges of the work sheets and having sliding contact with the heads 40, 41 of the platen. Located in the rear of the platen is a brace rod 81 secured to supporting arms 82, 82 which are mounted on the inner faces of the carriage end plates 6, 7. Pivoted on the supporting arms 82, 82 by shouldered screws 83, 83 and spaced upwardly are upwardly extending operating arms 84, 85 to which are pivotally connected at their upper or free ends as at 86, 87 the free or rear ends of the arms 79, 80 of the positioning bail 77. As shown in Figure 5, the arm 84 is pivotally connected as at 88 to the forward end of a link 89 having its rear end pivotally connected as at 90 to the upper arm 91 of the lever 68 which is fixed to the rock shaft 56. As shown in Figure 6, the arm 85 is pivotally connected as at 92 to the forward end of a link 93 having its rear end pivotally connected as at 94 to the upper arm 95 of the lever 55 which is fixed to the rock shaft 56. It will therefore be seen that, when the shaft 56 is rocked by movement of the carriage return lever 57 to the right, the operating arms 84, 85 will be swung forwardly and the positioning bail 77 will be moved forwardly, and that when the carriage return lever is released and returned to its initial position by the spring 76, the operating arms 84, 85 will be swung rearwardly and the positioning bail 77 will be moved rearwardly to its normal or operative position. It will also be observed that the rock shaft 56 is the common driving element for both the platen C and the positioning bail 77; that when the platen is moved rearwardly the bail will be moved forwardly simultaneously to thereby cooperate with the platen movement and relieve the work sheets W from their relatively tight contact relation with the platen, and that the platen and the bail are respectively moved simultaneously forwardly and rearwardly to their normal or operative positions at which time the positioning bail 77 retains the work sheets directly above the writing line of the platen in spaced relation to the upper types when the lower types are being employed.

The positioning bail 77 is yieldably held in sliding contact with the heads 40, 41 of the platen by coil springs 96, 97 which are located in front of the pivots 86, 87 and have their upper ends connected to the arms 79, 80 of the bail and their lower ends connected to lugs 98, 99 respectively formed on the upper ends of the operating arms 83, 84 of the operating arms 84, 85. By having the arms 79, 80 of the positioning bail resting on the heads 40, 41 of the platen, the vertical position of the base 78 of the bail is always maintained when said bail is in its operative position.

The positioning bail 77 may be swung upwardly and rearwardly to the dotted line position shown in Figure 5 to permit the work sheets W to be pulled forwardly when loading the machine for the purpose of interleaving the carbon strips S in said work sheets, or to make erasures on the work sheets. The upward and rearward movement of the positioning bail is limited by laterally extending stop ears 100, 101 respectively formed on the upper end of the operating arms 83, 84, and engageable by the arms 79, 80 of the positioning bail. It will be observed that when the positioning bail 77 is swung upwardly to its inoperative position the springs 96, 97 will cross the pivots 86, 87 which connect the bail 77 and arms 84, 85 and thereby retain the positioning bail in said upward position.

The collating frame G comprises two spaced channel shaped side bars or standards 102, 103 which are rigidly although removably connected at their upper ends by a cross bar 104 by means of screws 105, 106 and have their lower ends fixed to the bearings 48, 49 of the platen C. Rearwardly and downwardly inclined braces 107, 108 are rigidly although removably connected at their upper ends to the side bars by screws 109, 110, and are rigidly connected at their lower ends by screws 111, 112 to the end plates 6, 7 of the carriage B, to thereby retain the collating frame in a vertical and stationary position.

The rock arm 50 of the platen is provided with an adjustable stop screw 50a (Figures 6, 7, and 8) which cooperates with the adjacent standard 103 of the stationary collating frame G to thereby variably limit the forward or operative position of the platen C.

It will be observed that the positioning bail 77 is located between the side bars 102, 103 of the collating frame, and consequently said bail is free to be moved forwardly and backwardly and to be swung upwardly and rearwardly without interfering with the collating frame.

The truck F is line spaced upwardly along the collating frame G by the carriage return lever 57 in timed relation with the backward and forward movements of the platen C and positioning bail 77. The truck F, together with the connections between the truck and the carriage return lever 57, is disclosed generally in the patent to Degener 1,853,761, of April 12, 1932.

The truck or clamp F (Figure 11) includes a relatively stationary clamping plate x and a relatively movable clamping plate y between which the lead-in ends of the work sheets W are adapted to be clamped. A manually operable means including a cam 113 and a finger lever 113a is mounted on the truck for moving the movable clamping plate y against the tension of a spring 114 when it is desired to insert the work sheets in the clamp, or to release them therefrom. The truck also carries a horizontal shaft 115 having pinions 116, 117 thereon which engage vertical rack bars 118, 119 fixed to the inner flanges of the side bars for maintaining the truck in its horizontal position when being moved upwardly or downwardly along the collating frame.

Removably attached to the outer flange of the standard 102 by screws 120, 120 is a stationary and longitudinally extending ratchet bar 121 having ratchet teeth 122 along its rear face. A lifting bar 123 is slidably mounted on the side bar 102 between the rack 118 and the stationary ratchet bar 121 for longitudinal movements relative thereto, and is provided with ratchet teeth 124 along its rear face. The lifting bar 123 is provided with spaced upper and lower pairs of guide flanges 125, 125 and 126, 126, and upper and lower pairs of guide pins 127, 127a and 128, 128a are respectively mounted on the stationary rack bar 118 and the stationary ratchet bar 121 for retaining the lifting bar 123 in place.

A bracket plate 129 (Figures 10, 11, and 13) is rigidly connected to the truck or clamp F and extends rearwardly of the side bar 102 of the collating frame. A lifting pawl 130 and a holding pawl 131 are fulcrumed on a pin 132 fixed to the bracket plate 129, the lifting pawl 130 engaging the teeth of the ratchet lifting bar 123 and the holding pawl 131 engaging the teeth of the stationary ratchet bar 121. These pawls are normally held in engagement with the teeth of said ratchet bars by means of coil springs 133 and 134. It will thus be seen that, when the lifting bar 123 is elevated, the lifting pawl 130 will cause the truck F to be correspondingly elevated, and when pressure is released from the lifting bar the holding pawl 131 will retain the truck in its elevated position. The distance between any two adjacent teeth of the lifting bar corresponds to the distance of a single space, and it will therefore be apparent that as the truck or clamp F is elevated step-by-step the work sheets W will be correspondingly line spaced.

A manually operable means including finger pieces 135, 136 is mounted on the truck F for releasing the pawls 130, 131 whereby the truck may be lowered by gravity to the bottom of the collating frame G whenever it is desired to have the truck engage the next form on the work sheet.

The lower end of the lifting bar 123 is connected by a link 137 to a headless stud 137a mounted on the horizontal arm 138 of a bell crank lever 139 which is fulcrumed on a horizontal bearing pin 140 fixed on the end plate 6 of the carriage B. (See Figures 5, 11, 17, and 18.) The upwardly extending or vertical arm 141 of said bell crank lever 139 is connected by an adjustable eccentric pivot 142 to the rear end of a link 143. (See Figures 5 and 11.) The front end of the link 143 is pivotally connected as at 144 to a lever 145 which is fulcrumed on the pivot 63 on the shelf 59. (See Figures 4 and 18.) The lever 145 is provided with a forwardly extending arm 146 which terminates in an upturned toe 147. When the carriage return lever 57 is released, the spring 76 will effect a return of the positioning bail 77 and the platen C together with the lever 62 to their initial positions, and the lifting bar 123 will gravitate to its initial position and thereby effect a return of the lever 145 to its initial position.

Journaled on the cam head 60 of the carriage return lever 57 is a roller 148 which, when the lever 57 is in its normal position, is spaced a considerable distance from the toe 147 of the lever 145 and will not contact said toe until after the lever 57 has actuated the lever 62 to effect the forward movement of the positioning bail 77 and the rearward movement of the platen C. After the roller 61 leaves the cam edge 60a of the carriage return lever 57, it contacts a concentric edge portion or dwell 60b. Thus, upon continued movement of the carriage return lever to the right, the lever 145 will be actuated while the lever 62 will be idle. As a result of this timing of the parts, the positioning bail 77 and the platen C will remain in their inoperative positions during the line spacing movement of the truck or clamp F, or, in other words, the line spacing of the work sheets will occur subsequent to the platen and the positioning bail being respectively moved rearwardly and forwardly to relieve the normal tight contact relation of the work sheets and carbon strips with the platen. When the carriage return lever 57 is released, the spring 76 will effect a return of the positioning bail 77 and the platen C together with the lever 62 to their initial positions, and the lifting bar 123 will gravitate to its initial position and thereby effect a return of the lever 145 to its initial position.

In the event that it is desired to employ a new form of work sheet W of different line spacing, it will be necessary to substitute a new ratchet bar 121 and a new lifting bar 123 having teeth of different pitch. This is accomplished by removing the screws 120 from the stationary ratchet bar 121 and sliding the link 137 laterally off the headless stud 137a, and then removing the lifting bar 123 and the stationary ratchet bar 121 through the top of the collating frame G. This removal of the bars 121 and 123 can be effected only after the cross bar 104 and the braces 107 have been partly disassembled by removing the screws 105, 106, 109, and 110. It will be understood that the pawls 130, 131 will be held out of engagement with the teeth of said bars 121, 123 during the time the substitution is being made. It will also be observed that by means of the adjustable eccentric pivot 142 the amount of lifting movement imparted to the lifting bar 123 may be adjusted to conform to the line spacing arrangement of the new work sheet W.

The carbon strips S are unwound from spool assemblies s which are journaled on a frame 149 which is mounted on the rear of the carriage B for horizontal forward and backward movements transversely of the machine.

The carbon strips S of the respective sets of spool assemblies are led from the spools around horizontal guide pins 223 which are fixed to and extend rearwardly from the spool plate 150; thence around three sets of vertical rolls 224 mounted on a shelf 225 attached to the end plate 6 of the carriage, the sets being arranged in alinement with the spools and in offset or diagonal relation, and each set including three rolls arranged in a row; thence forwardly towards the carriage return lever 57; thence around a single roll 226 mounted on the front end of the shelf 225; thence along in front of the platen C and in interleaved relation with the work sheets W; thence around a single roll 227 mounted on a shelf 228 on the carriage end plate 7; and thence rearwardly to a strip feeding mechanism Y which is mounted on the shelf 228 and is identical with that shown in the Degener Patent 1,853,761, said feeding means including a pair of feed rollers 225, 226 which are positively actuated through the medium of a link 230 (Figure 3) connected to the bell crank lever 71 each time the carriage return lever 57 is swung to the right.

The mechanism for mounting and feeding the carbon strips S is disclosed and claimed in my co-pending application Serial No. 92,241, filed July 23, 1936.

From the foregoing it will be observed that the eccentric axis of the platen is located within a circle prescribed by the arcuate writing line of the platen, and consequently the rearward and upward movement of the platen is fast and the normal tight contact relation between the work sheets and the platen is relieved in a very rapid manner so as to permit the carbon strips to be fed through the work sheets with a minimum amount of friction; that the major axis of the platen contains the writing line of the platen, and consequently the force of impact by the type bars will be directed against the fixed axis of the platen; that the positioning bail functions normally to prevent the upper types from contacting the work sheets, and is movable forwardly in timed relation with the rearward movement of the platen to free the work sheets prior to the strip feeding operation and prior to the line spacing movement of the work sheets; and that the ratchet bars of the line spacing mechanism may be readily removed and others substituted whenever it is desired to vary the amount of line space imparted to the work sheets.

It is, of course, to be understood that the details of structure and arrangement of parts may be variously changed and modified without departing from the spirit and scope of my invention.

I claim:

1. In a typewriting machine, the combination with a platen comprising a cylinder having end caps provided with eccentric bearings, of a shaft extending through and rigidly connected to said end caps and forming an eccentric axis for said platen, spaced supports in which the ends of the shaft are journaled, and means for rocking the platen about its eccentric axis.

2. In a typewriting machine, the combination with a platen comprising a cylinder having end caps provided with eccentric bearings, of a shaft extending through and rigidly connected to said end caps and forming an eccentric axis for said platen, spaced supports in which the ends of the shaft are journaled, the cylinder being mounted on the end caps for angular adjustment relative thereto, means for securing the platen to the end caps in any position of adjustment, and means for rocking the platen about its eccentric axis.

3. In a typewriting machine, the combination with a cylindrical platen, of means for supporting the platen for rocking movements about a fixed axis located eccentrically within the periphery of the platen, means for rocking the platen forwardly and rearwardly about its eccentric axis, and adjustable means separate from the rocking means for variably limiting the forward movement of the platen.

4. In a typewriting machine, the combination with a platen comprising a cylinder having end caps provided with eccentric bearings, of a shaft extending through and rigidly connected to said end caps and forming an eccentric axis for said platen, spaced supports in which the ends of the shaft are journaled, means for rocking the platen forwardly and rearwardly about its eccentric axis, and adjustable means separate from the rocking means for variably limiting the forward movement of the platen.

5. In a typewriting machine, the combination with a platen having a transversely arcuate face, of means for supporting the platen for rocking movements about an axis located eccentrically with respect to said arcuate face, guides respectively located above and below the platen for directing a work sheet upwardly in front of the platen, type bars for contacting the work sheet on the writing line of the platen, the writing line of the platen and the work sheet being normally disposed in tight contact relation, the transverse axis of the platen intersecting the writing line of the platen and the eccentric axis thereof, and means for swinging the platen rearwardly about its eccentric axis to relieve said tight contact relation between the work sheet and the platen.

6. In a typewriting machine, the combination with a platen having a transversely arcuate face, of means for supporting the platen for rocking movements about an axis located eccentrically with respect to said arcuate face, guides respectively located above and below the platen for directing a work sheet upwardly in front of the platen, type bars for contacting the work sheet on the writing line of the platen, the writing line of the platen and the work sheet being normally disposed in tight contact relation, the transverse axis of the platen intersecting the writing line of the platen and the eccentric axis thereof, means for swinging the platen rearwardly about its eccentric axis to relieve said tight contact relation between the work sheet and the platen, and adjustable means for variably limiting the forward movement of the platen.

7. In a typewriting machine, the combination with a cylindrical platen having an eccentric axis located within the cylinder, of means for supporting the platen for rocking movements about its axis, guides respectively located above and below the platen for directing a work sheet upwardly in front of the platen, type bars for contacting the work sheet on the writing line of the platen, the writing line of the platen and the work sheet being normally disposed in tight contact relation, the major transverse axis of the platen intersecting the writing line of the platen and the eccentric axis thereof, means for swinging the platen rearwardly about its eccentric axis to relieve said tight contact relation between the work sheet and the platen, and adjustable means for variably limiting the forward movement of the platen.

8. In a typewriting machine, the combination with a platen comprising a cylinder having end caps provided with eccentric bearings, of a shaft extending through and rigidly connected to said end caps and forming an eccentric axis for said platen, spaced supports in which the ends of the shaft are journaled, guides respectively located above and below the platen for directing a work sheet upwardly in front of the platen, type bars for contacting the work sheet on the writing line of the platen, the writing line of the platen and the work sheet being normally disposed in tight contact relation, the major transverse axis of the platen intersecting the writing line of the platen and the eccentric axis thereof, means for swinging the platen rearwardly about its eccentric axis to relieve said tight contact relation between the work sheet and the platen, and adjustable means for variably limiting the forward movement of the platen.

9. In a typewriting machine, the combination with a carriage, of a platen having a transversely arcuate face, means for supporting the platen on the carriage for rocking movements about an axis located eccentrically with respect to said arcuate face, guides mounted on the carriage and located respectively above and below the platen for directing a work sheet upwardly in front of the platen, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, and connections between said lever and the platen for swinging the platen rearwardly about its eccentric axis to relieve said tight contact relation between the work sheet and the platen.

10. In a typewriting machine, the combination with a carriage, of a platen comprising a cylinder having end caps provided with eccentric bearings, a shaft extending through and rigidly connected to said end caps and forming an eccentric axis for said platen, means for supporting the shaft on the carriage, guides mounted on the carriage and located respectively above and below the platen for directing a work sheet upwardly in front of the platen, type bars for contacting the work sheet on the writing line of the platen, the writing line of the platen and the work sheet being normally disposed in tight contact relation, the major transverse axis of the platen intersecting the writing line of the platen and the eccentric axis thereof, an operating lever mounted on the carriage, and connections between said lever and the platen for swinging the platen rearwardly about its eccentric axis to relieve said tight contact relation between the work sheet and the platen.

11. In a typewriting machine, the combination with a carriage, of a platen having a transversely arcuate face, means for supporting the platen on the carriage for rocking movements about an axis located eccentrically with respect to said arcuate face, guides mounted on the carriage and located respectively above and below the platen for directing a work sheet upwardly in front of the platen, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, connections between said lever and the platen for swinging the platen upwardly and rearwardly about its eccentric axis to relieve said tight contact relation between the work sheet and the platen, and adjustable means for variably limiting the forward movement of the platen.

12. In a typewriting machine, the combination with a carriage, of a cylindrical platen having an eccentric axis located within the cylinder, means for supporting the platen on the carriage for rocking movements about its eccentric axis, guides mounted on the carriage and located respectively above and below the platen for directing a work sheet upwardly in front of the platen, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, connections between said lever and the platen for swinging the platen upwardly and rearwardly about its eccentric axis to relieve said contact relation between the work sheet and the platen, and adjustable means for variably limiting the forward movement of the platen.

13. In a typewriting machine, the combination with a carriage, of a platen comprising a cylinder having end caps provided with eccentric bearings, a shaft extending through and rigidly connected to said end caps and forming an eccentric axis for said platen, means for supporting the shaft on the carriage, guides mounted on the carriage and located respectively above and below the platen for directing a work sheet upwardly in front of the platen, type bars for contacting the work sheet on the writing line of the platen, the writing line of the platen and the work sheet being normally disposed in tight contact relation, the major transverse axis of the platen intersecting the writing line of the platen and the eccentric axis thereof, an operating lever mounted on the carriage, connections between said lever and the platen for swinging the platen upwardly and rearwardly about its eccentric axis to relieve said tight contact relation between the work sheet and the platen, and adjustable means for variably limiting the forward movement of the platen.

14. In a typewriting machine, the combination with a carriage, of a platen having a transversely arcuate face, means for supporting the platen on the carriage for rocking movements about an axis located eccentrically with respect to said arcuate face, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, and connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved.

15. In a typewriting machine, the combination with a carriage, of a cylindrical platen having an eccentric axis located within the cylinder, means for supporting the platen on the carriage for rocking movements about its eccentric axis, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, and connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved.

16. In a typewriting machine, the combination with a carriage, of a platen comprising a cylinder having end caps provided with eccentric bearings, a shaft extending through and rigidly connected to said end caps and forming an eccentric axis for said platen, means for supporting the shaft on the carriage, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, and connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved.

17. In a typewriting machine, the combination with a carriage, of a platen having a transversely arcuate face, means for supporting the platen on the carriage for rocking movements about an axis located eccentrically with respect to said arcuate face, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved, and adjustable means for variably limiting the forward movement of the platen.

18. In a typewriting machine, the combination with a carriage, of a platen having a transversely arcuate face, means for supporting the platen on the carriage for rocking movements about an axis located eccentrically with respect to said arcuate face, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, the transverse axis of the platen intersecting the writing line of the platen and the eccentric axis thereof, an operating lever mounted on the carriage, connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved, and adjustable means movable with the platen for contacting the collating frame to limit the forward movement of the platen.

19. In a typewriting machine, the combination with a platen having a transversely arcuate face, of guides respectively located above and below the platen for positioning a work sheet in front of and in tight contact relation with said arcuate face of the platen, means for supporting the platen for rearward and forward movements relative to said work sheet, a bail normally engaging the work sheet between the upper guide and the platen for curving the sheet rearwardly against the platen above the writing line thereof, means for supporting the bail for forward and backward movements relative to the work sheet, and means including a manually operable lever for moving the platen and bail rearwardly and forwardly respectively to relieve the normal tight contact relation between the work sheet and the platen.

20. In a typewriting machine, the combination with a platen having a transversely arcuate face, of guides respectively located above and below the platen for positioning a work sheet in front of and in tight contact relation with the arcuate face of the platen, means for supporting the platen for rocking movements about an axis located eccentrically with respect to said arcuate face, said platen face being normally disposed in tight contact relation with the work sheet, a bail engaging the work sheet between the upper guide and the platen for curving the sheet rearwardly against the platen above the writing line thereof, and operating means for rocking the platen and for moving the bail rearwardly and forwardly respectively to relieve the normal tight contact relation between the work sheet and the platen.

21. In a typewriting machine, the combination with a carriage, of a platen mounted on the carriage and having a transversely arcuate face, guides mounted on the carriage and respectively located above and below the platen for positioning a work sheet in front of and in tight contact relation with said arcuate face of the platen, means for supporting the platen on the carriage for rearward and forward movements relative to said work sheet, a substantially horizontal U-shaped bail having a base for engaging the work sheet between the upper guide and the platen for directing the sheet rearwardly against the platen above the writing line thereof, said base having rearwardly extending arms, substantially vertical arms located in rear of the platen and having their lower ends pivoted to the carriage and having their upper ends pivoted to the rearwardly extending arms of the bail, and means including an operating lever mounted on the carriage for moving the platen and bail rearwardly and forwardly respectively to relieve the normal tight contact relation between the work sheet and the platen.

22. In a typewriting machine, the combination with a platen having a transversely arcuate face, of guides respectively located above and below the platen for positioning a work sheet in front of and in tight contact relation with said arcuate face of the platen, means for supporting the platen for rearward and forward movements relative to said work sheet, an arm normally engaging the work sheet between the upper guide and the platen for curving the sheet rearwardly against the platen above the writing line thereof, means for supporting the arm for forward and backward movements relative to the work sheet, and means for moving the platen and arm rearwardly and forwardly respectively to relieve the normal tight contact relation between the work sheet and the platen comprising a rock shaft, connections between the rock shaft and the platen, connections between the rock shaft and the arm, and an operating lever for actuating said rock shaft.

23. In a typewriting machine, the combination with a platen having a transversely arcuate face, of guides respectively located above and below the platen for positioning a work sheet in front of and in tight contact relation with said arcuate face of the platen, means for supporting the platen for rearward and forward movements relative to said work sheet, an arm normally engaging the work sheet between the upper guide and the platen for curving the sheet rearwardly against the platen above the writing line thereof, means for supporting the arm for forward and backward movements relative to the work sheet, means including an operating lever for moving the platen and arm rearwardly and forwardly respectively to relieve the normal tight contact relation between the work sheet and the platen, and adjustable means for variably limiting the forward movement of the platen.

24. In a typewriting machine, the combination with a platen having a transversely arcuate face, of a guide disposed below the platen for directing a work sheet upwardly in front of the platen, a clamp mounted above the platen for engaging the lead-in end of the work sheet and movable for line spacing said sheet upwardly in front of the platen, said work sheet being normally disposed in tight contact relation with the arcuate face of the platen, means for supporting the platen for rearward and forward movements relative to the work sheet, an arm normally engaging the work sheet between the line spacing clamp and the platen for curving the sheet rearwardly against the platen above the writing line thereof, means for supporting the arm for forward and rearward movements relative to the work sheet, and means including a manually operable lever for first moving the platen and arm rearwardly and forwardly respectively to relieve the normal tight contact relation between the work sheet and the platen and for subsequently effecting a line spacing movement to the clamp while said tight contact relation is relieved.

25. In a typewriting machine, the combination with a platen having a transversely arcuate face, of a guide disposed below the platen for directing a work sheet upwardly in front of the platen, a clamp mounted above the platen for engaging the lead-in end of the work sheet and movable for line spacing said sheet upwardly in front of the platen, said work sheet being normally disposed in tight contact relation with the arcuate face of the platen, means for supporting the platen for rearward and forward movements relative to the work sheet, an arm normally engaging the work sheet between the line spacing clamp and the platen for curving the sheet rearwardly against the platen above the writing line thereof, means for supporting the arm for forward and rearward movements relative to the work sheet, and means including a lever for first moving the platen and arm rearwardly and forwardly respectively to relieve the normal tight contact relation between the work sheet and the platen and for subsequently effecting a line spacing movement to the clamp while said tight contact relation is relieved, said last named means comprising a rock shaft, connections between the rock shaft and the platen, connections between the rock shaft and the arm, and connections between the rock shaft and the lever.

26. In a typewriting machine, the combination with a carriage, of a platen having a transversely arcuate face, a collating frame mounted on the carriage and extending upwardly above the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rearward and forward movements relative to the work sheet, an arm normally engaging the work sheet between the clamp and the platen for curving the work sheet rearwardly against the platen above the writing line thereof, means for supporting the arm on the carriage for forward and rearward movements relative to the work sheet, and means including a manually operable lever mounted on the carriage for first moving the platen and arm rearwardly and forwardly respectively to relieve the normal tight contact relation between the work sheet and the platen and for subsequently effecting a line spacing movement to the clamp while said tight contact relation is relieved.

27. In a typewriting machine, the combination with a carriage, of a platen having a transversely arcuate face, a collating frame mounted on the carriage and extending upwardly above the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rocking movements about an axis located eccentrically with respect to said arcuate face, the transverse axis of the platen intersecting the writing line of the platen and the eccentric axis thereof, an arm normally engaging the work sheet between the truck and the platen for curving the work sheet rearwardly against the platen above the writing line thereof, means for supporting the arm on the carriage for forward and rearward movements relative to the work sheet, and means including a manually operable lever mounted on the carriage for first moving the platen and arm rearwardly and forwardly respectively to relieve the normal tight contact relation between the work sheet and the platen and for subsequently effecting a line spacing movement to the clamp while said tight contact relation is relieved.

28. In a typewriting machine, the combination with a carriage, of a platen having a transversely arcuate face, a collating frame mounted on the carriage and including spaced standards located beyond the ends of the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rearward and forward movements relative to the work sheet, a substantially horizontal U-shaped bail having its base engaging the work sheet between the clamp and the platen for curving the work sheet rearwardly against the platen above the writing line thereof, said bail having arms extending rearwardly between the standards of the collating frame and having sliding contact with the ends of the platen, substantially vertical arms located in rear of the platen and having their upper ends pivotally connected to the arms of the bail and having their lower ends pivoted on the carriage, and means including a manually operable lever mounted on the carriage for first moving the platen and bail rearwardly and forwardly respectively to relieve the normal tight contact relation between the work sheet and the platen and for subsequently effecting a line spacing movement to the clamp while said tight contact relation is relieved.

29. In a typewriting machine, the combination with a carriage, of a platen having a transversely arcuate face, a collating frame mounted on the carriage and extending upwardly above the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rearward and forward movements relative to the work sheet, an arm normally engaging the work sheet between the clamp and the platen for curving the work sheet rearwardly against the platen above the writing line thereof, means for supporting the arm on the carriage for forward and rearward movements relative to the work sheet, and means including a manually operable lever mounted on the carriage for first moving the platen and arm rearwardly and forwardly respectively to relieve the normal tight contact relation between the work sheet and the platen and for subsequently effecting a line spacing movement to the clamp while said tight contact relation is relieved, said last named means comprising a rock shaft, connections between the rock shaft and the platen, connections between the rock shaft and the bail, connections between the rock shaft and the clamp, and connections between the rock shaft and the manually operable lever.

30. In a typewriting machine, the combination with a carriage, of a platen having a transversely arcuate face, a collating frame mounted on the carriage and extending upwardly above the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rocking movements about an axis located eccentrically with respect to said arcuate face, an arm normally engaging the work sheet between the truck and the platen for curving the work sheet rearwardly against the platen above the writing line thereof, means for supporting the arm on the carriage for forward and rearward movements relative to the work sheet, and means including a manually operable lever mounted on the carriage for first moving the platen and arm rearwardly and forwardly respectively to relieve the normal tight contact relation between the work sheet and the platen and for subsequently effecting a line spacing movement to the clamp while said tight contact relation is relieved, said last named connections comprising a rock arm movable with the platen, a rock shaft, connections between the rock arm and the rock shaft, connections between the bail and the rock shaft, connections between the clamp and the rock shaft, and connections between the rock shaft and the manually operable lever.

31. In a typewriting machine, the combination with a carriage, of a platen having a transversely arcuate face, a collating frame mounted on the carriage and including spaced standards located beyond the ends of the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rearward and forward movements relative to the work sheet, a bail normally engaging the work sheet between the clamp and the platen for curving the work sheet rearwardly against the platen above the writing line thereof, means for supporting the bail on the carriage for forward and rearward movements relative to the work sheet, said bail being pivotally mounted to swing upwardly and rearwardly between the standards of the collating frame and under the clamp to an inoperative position, and means including a lever mounted on the carriage for first moving the platen and bail rearwardly and forwardly respectively to relieve the normal tight contact relation between the work sheet and the platen and for subsequently effecting a line spacing movement to the clamp while said tight contact relation is relieved.

32. In a typewriting machine, the combination with a carriage, of a platen having a transversely arcuate face, a collating frame mounted on the carriage and including spaced standards located beyond the ends of the platen, a clamp mounted on the collating frame for line spacing movements, a guide mounted on the carriage for directing a work sheet upwardly in front of the platen to said clamp, the work sheet being normally in tight contact relation with the platen, means for supporting the platen on the carriage for rearward and forward movements relative to the work sheet, adjustable means movable with the platen for cooperation with the collating frame to variably limit the forward movement of the platen, a bail normally engaging the work sheet between the clamp and the platen for curving the work sheet rearwardly against the platen above the writing line thereof, means for supporting the bail on the carriage for forward and rearward movements between the standards of the collating frame, and means including a manually operable lever mounted on the carriage for first moving the platen and bail rearwardly and forwardly respectively to relieve the normal tight contact relation between the work sheet and the platen and for subsequently effecting a line spacing movement to the clamp while said tight contact relation is relieved.

33. In a typewriting machine, the combination with a platen having a transversely arcuate face, of means for supporting the platen for rocking movements about an axis located eccentrically with respect to said arcuate face, guides respectively located above and below the platen for directing a work sheet upwardly and vertically in front of the platen and for maintaining said work sheets in said vertical position, type bars for contacting the work sheet on the writing line of the platen, the writing line of the platen and the work sheet being normally disposed in tight contact relation, and means for swinging the platen rearwardly about its eccentric axis to relieve said tight contact relation between the work sheet and the platen.

34. In a typewriting machine, the combination with a cylindrical platen having an eccentric axis located within the cylinder, of means for supporting the platen for rocking movements about its axis, guides respectively located above and below the platen for directing a work sheet upwardly in front of the platen, type bars for contacting the work sheet on the writing line of the platen, the writing line of the platen and the work sheet being normally disposed in tight contact relation, the major transverse axis of the platen intersecting the writing line of the platen and the eccentric axis thereof, and means for swinging the platen rearwardly about its eccentric axis to relieve said tight contact relation between the work sheet and the platen.

35. In a typewriting machine, the combination with a carriage, of a cylindrical platen having an eccentric axis located within the cylinder, means for supporting the platen on the carriage for rocking movements about its eccentric axis, a collating frame mounted on the carriage and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, an operating lever mounted on the carriage, and connections between said lever and the platen and between said lever and the truck for first swinging the platen rearwardly about its eccentric axis to relieve said tight contact relation between the work sheet and the platen and for thereafter effecting a line spacing movement to the truck while said tight contact relation is relieved.

36. In a typewriting machine, the combination with a carriage, of a platen having a transversely arcuate face, means for supporting the platen on the carriage for rocking movements about an axis located eccentrically with respect to said arcuate face, a collating frame mounted on the carriage, and extending upwardly above the platen, a truck mounted on the collating frame for line spacing movements, a guide mounted on the carriage below the platen for directing a work sheet upwardly in front of the platen to said truck, type bars for contacting the work sheet on the writing line of the platen, the writing line of the platen and the work sheet being normally disposed in tight contact relation, a rock arm having rigid connection with the platen, an operating lever mounted on the carriage, connections between the lever and the rock arm and between said lever and the truck for first swinging the platen rearwardly about its eccentric axis to relieve said tight contact relation between the work sheet and the platen and for thereafter effecting a line spacing movement to the truck while said tight contact relation is relieved, and an adjustable stop screw mounted on the rock arm for contacting the collating frame to limit the forward movement of the platen.

37. In a typewriting machine, the combination with a platen having a transversely arcuate face, of guides respectively located above and below the platen for positioning a work sheet in front of and in tight contact relation with said arcuate face of the platen, means for supporting the platen for rearward and forward movements relative to said work sheet, an arm normally engaging the work sheet between the upper guide and the platen for curving the sheet rearwardly against the platen above the writing line thereof, means for supporting the arm for forward and backward movements relative to the work sheet, and operating means for moving the platen and arm rearwardly and forwardly respectively to relieve the normal tight contact relation between the work sheet and the platen.

38. In a typewriting machine, the combination with a platen having a transversely arcuate face, of guides respectively located above and below the platen for positioning a work sheet in front of and in tight contact relation with the arcuate face of the platen, means for supporting the platen for rocking movements rearwardly and forwardly relative to the work sheet, an arm engaging the work sheet between the upper guide and the platen for curving the sheet rearwardly against the platen above the writing line thereof, and operating means for rocking the platen and moving the arm rearwardly and forwardly respectively to relieve the normal tight contact relation between the work sheet and the platen.

39. In a typewriting machine, the combination with a platen having a transversely arcuate face, of a work sheet feeding means located above the platen, means for directing a work sheet upwardly in front of the platen to said feeding means, an arm engaging the work sheet between the platen and the feeding means for curving the sheet rearwardly against the platen above the writing line thereof, and means for first moving the arm forwardly to relieve the normal tight contact relation between the work sheet and the platen and for subsequently operating said feeding means.

40. In a typewriting machine, the combination with a platen having a transversely arcuate face, of a work sheet feeding means located above the platen, means for directing a work sheet upwardly in front of the platen to said feeding means, means for supporting the platen for rearward and forward movements relative to said work sheet, an arm engaging the work sheet between the platen and the feeding means for curving the sheet rearwardly against the platen above the writing line thereof, means for supporting the arm for forward and backward movements relative to said work sheet, and means for first moving the platen and arm rearwardly and forwardly to relieve the normal tight contact relation between the work sheet and the platen and for subsequently operating said feeding means.

41. In a typewriting machine, the combination with a platen having a transversely arcuate face, of a guide disposed below the platen for directing a work sheet upwardly in front of the platen, a clamp mounted above the platen for engaging the lead-in end of the work sheet, said work sheet being normally disposed in tight contact relation with the arcuate face of the platen, means for supporting the platen for rearward and forward movements relative to the work sheet, an arm normally engaging the work sheet between the line spacing clamp and the platen for curving the sheet rearwardly against the platen above the writing line thereof, means for supporting the arm for forward and rearward movements relative to the work sheet, and means for moving the platen and arm rearwardly and forwardly respectively to relieve the normal tight contact relation between the work sheet and the platen.

GEORGE F. HANDLEY.